United States Patent
Gonzalez

(10) Patent No.: US 6,598,653 B1
(45) Date of Patent: Jul. 29, 2003

(54) WINDSHIELD COVERING SYSTEM

(76) Inventor: Joe B. Gonzalez, 1005 Dora's Dr., Pflugerville, TX (US) 78660

( * ) Notice: Subject to any disclaimer, the term of this patent is extended or adjusted under 35 U.S.C. 154(b) by 0 days.

(21) Appl. No.: 09/948,743

(22) Filed: Sep. 7, 2001

(51) Int. Cl.$^7$ ................................................. B60J 1/20
(52) U.S. Cl. ............. 160/370.21; 160/265; 160/370.22; 296/97.7
(58) Field of Search ..................... 160/264, 267.1, 160/265, 370.21, 370.22, 370.23; 296/97.6, 97.7, 97.8, 136

(56) References Cited

U.S. PATENT DOCUMENTS

| | | | |
|---|---|---|---|
| 1,448,016 A | * | 3/1923 | Welshausen ............ 160/370.21 |
| 1,621,972 A | * | 3/1927 | Darby .................... 160/370.21 |
| 2,851,303 A | * | 9/1958 | McQueen ............... 160/370.21 |
| 3,662,913 A | * | 5/1972 | Mascia ........................ 220/23 |
| 3,777,970 A | * | 12/1973 | Schwartzkopf ........... 229/54 R |
| 3,811,543 A | * | 5/1974 | Parrochia ..................... 190/43 |
| 3,856,171 A | * | 12/1974 | Rossi .......................... 215/256 |
| 4,597,608 A |   | 7/1986 | Duffy |
| 4,685,570 A | * | 8/1987 | Medow ....................... 206/579 |
| 4,811,982 A |   | 3/1989 | Carlyle |
| 4,848,825 A |   | 7/1989 | Niernberger |
| 5,036,898 A | * | 8/1991 | Chen ................. 160/370.21 X |
| 5,037,156 A |   | 8/1991 | Lundberg |
| 5,205,332 A | * | 4/1993 | Lii ..................... 160/370.21 X |
| 5,211,438 A |   | 5/1993 | Snow |
| 5,409,286 A | * | 4/1995 | Huang ......................... 296/136 |
| 5,443,923 A | * | 8/1995 | Laniado et al. ......... 296/97.1 X |
| 5,564,770 A | * | 10/1996 | Smith et al. ................ 296/95.1 |
| 5,570,734 A | * | 11/1996 | Wu ........................ 160/370.21 |
| 5,653,277 A | * | 8/1997 | Kerner et al. .......... 160/370.22 |
| D399,176 S |   | 10/1998 | Bramstedt |
| 5,860,466 A | * | 1/1999 | Kao ....................... 160/370.22 |
| 6,079,474 A | * | 6/2000 | Lin ........................ 160/370.22 |
| 6,125,908 A | * | 10/2000 | Ament et al. ............. 160/323.1 |
| 6,213,186 B1 | * | 4/2001 | Torres et al. .................. 160/24 |
| 6,299,033 B1 | * | 10/2001 | Ver Weyst et al. ......... 222/480 |

* cited by examiner

*Primary Examiner*—Bruce A. Lev

(57) ABSTRACT

A windshield covering system for conveniently covering a windshield to prevent ice and frost build up on the windshield. The windshield covering system includes a flexible panel having a handle assembly and a storage container for storing the panel and handle assembly.

1 Claim, 3 Drawing Sheets

WINDSHIELD COVERING SYSTEM

BACKGROUND OF THE INVENTION

1. Field of the Invention

The present invention relates to windshield covers and more particularly pertains to a new windshield covering system for conveniently covering a windshield to prevent ice and frost build up on the windshield.

2. Description of the Prior Art

The use of windshield covers is known in the prior art. More specifically, windshield covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,811,982; U.S. Pat. No. 4,597,608; U.S. Pat. No. 5,037,156; U.S. Pat. No. 4,848,825; U.S. Pat. No. 5,211,438; and U.S. Pat. No. Des. 399,176.

While these devices fulfill their respective, particular objectives and requirements, the aforementioned patents do not disclose a new windshield covering system. The inventive device includes a flexible panel having a handle assembly and a storage container for storing the panel and handle assembly.

In these respects, the windshield covering system according to the present invention substantially departs from the conventional concepts and designs of the prior art, and in so doing provides an apparatus primarily developed for the purpose of conveniently covering a windshield to prevent ice and frost build up on the windshield.

SUMMARY OF THE INVENTION

In view of the foregoing disadvantages inherent in the known types of windshield covers now present in the prior art, the present invention provides a new windshield covering system construction wherein the same can be utilized for conveniently covering a windshield to prevent ice and frost build up on the windshield.

The general purpose of the present invention, which will be described subsequently in greater detail, is to provide a new windshield covering system apparatus and method which has many of the advantages of the windshield covers mentioned heretofore and many novel features that result in a new windshield covering system which is not anticipated, rendered obvious, suggested, or even implied by any of the prior art windshield covers, either alone or in any combination thereof.

To attain this, the present invention generally comprises a flexible panel having a handle assembly and a storage container for storing the panel and handle assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new windshield covering system apparatus and method which has many of the advantages of the windshield covers mentioned heretofore and many novel features that result in a new windshield covering system which is not anticipated, rendered obvious, suggested, or even implied by any of the prior art windshield covers, either alone or in any combination thereof.

It is another object of the present invention to provide a new windshield covering system which may be easily and efficiently manufactured and marketed.

It is a further object of the present invention to provide a new windshield covering system which is of a durable and reliable construction.

An even further object of the present invention is to provide a new windshield covering system which is susceptible of a low cost of manufacture with regard to both materials and labor, and which accordingly is then susceptible of low prices of sale to the consuming public, thereby making such windshield covering system economically available to the buying public.

Still yet another object of the present invention is to provide a new windshield covering system which provides in the apparatuses and methods of the prior art some of the advantages thereof, while simultaneously overcoming some of the disadvantages normally associated therewith.

Still another object of the present invention is to provide a new windshield covering system for conveniently covering a windshield to prevent ice and frost build up on the windshield.

Yet another object of the present invention is to provide a new windshield covering system which includes a flexible panel having a handle assembly and a storage container for storing the panel and handle assembly.

Still yet another object of the present invention is to provide a new windshield covering system that is easily positioned over a windshield of a vehicle.

Even still another object of the present invention is to provide a new windshield covering system that provides a relatively stiff handle extending along one side for facilitating manipulation of the windshield covering system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
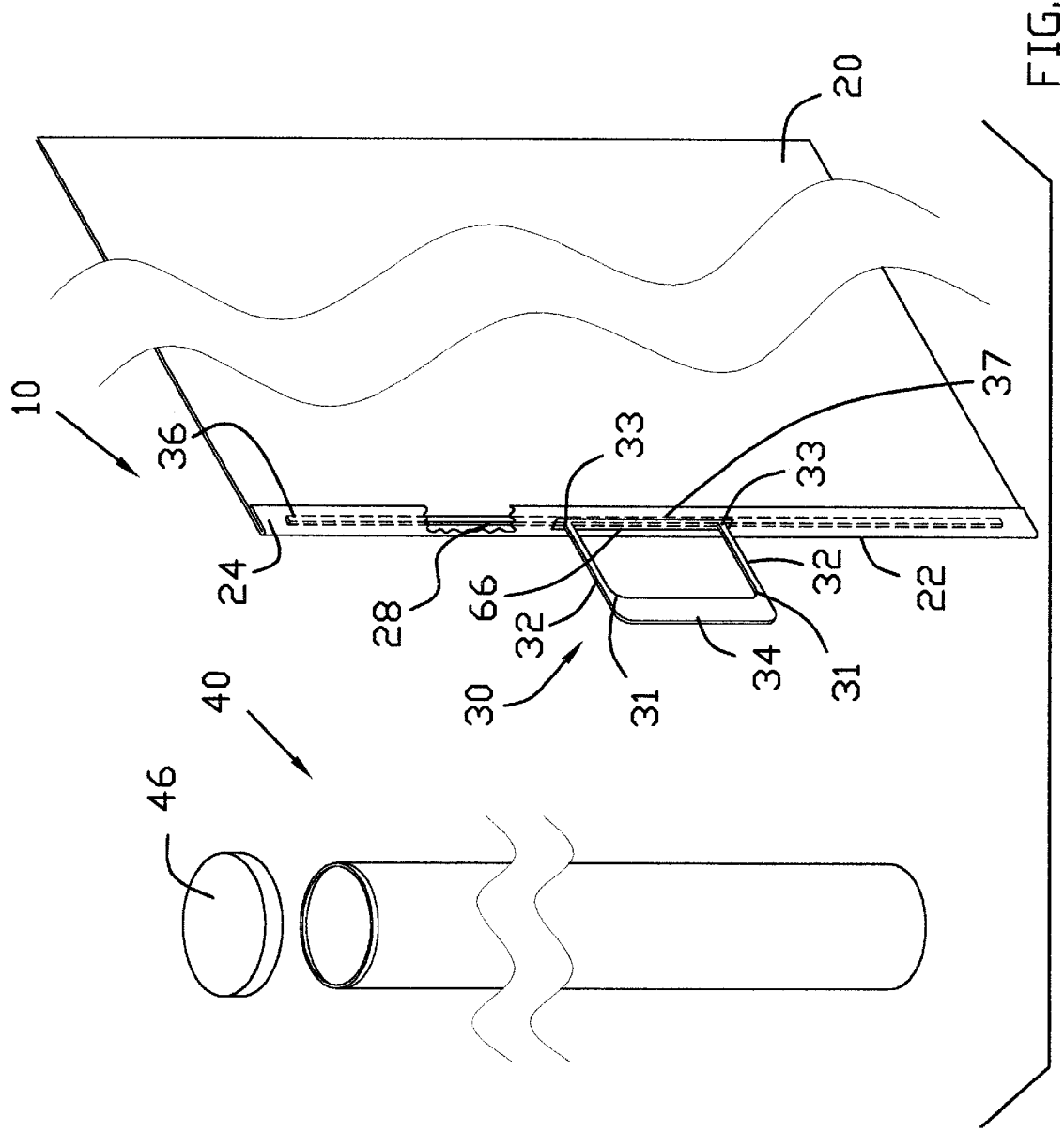
FIG. 1 is a perspective view of a new windshield covering system according to the present invention.
Figure 2:
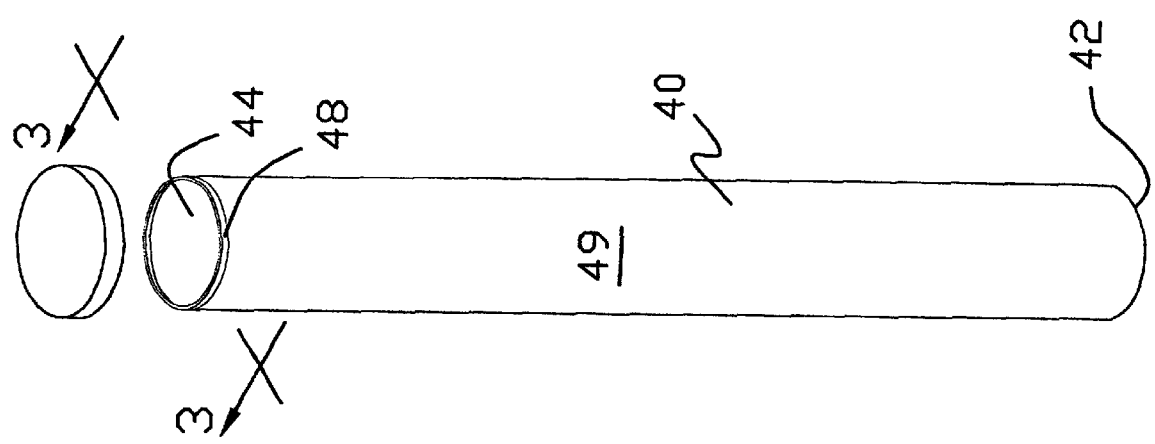
FIG. 2 is a perspective view of the storage container of the present invention.
Figure 3:
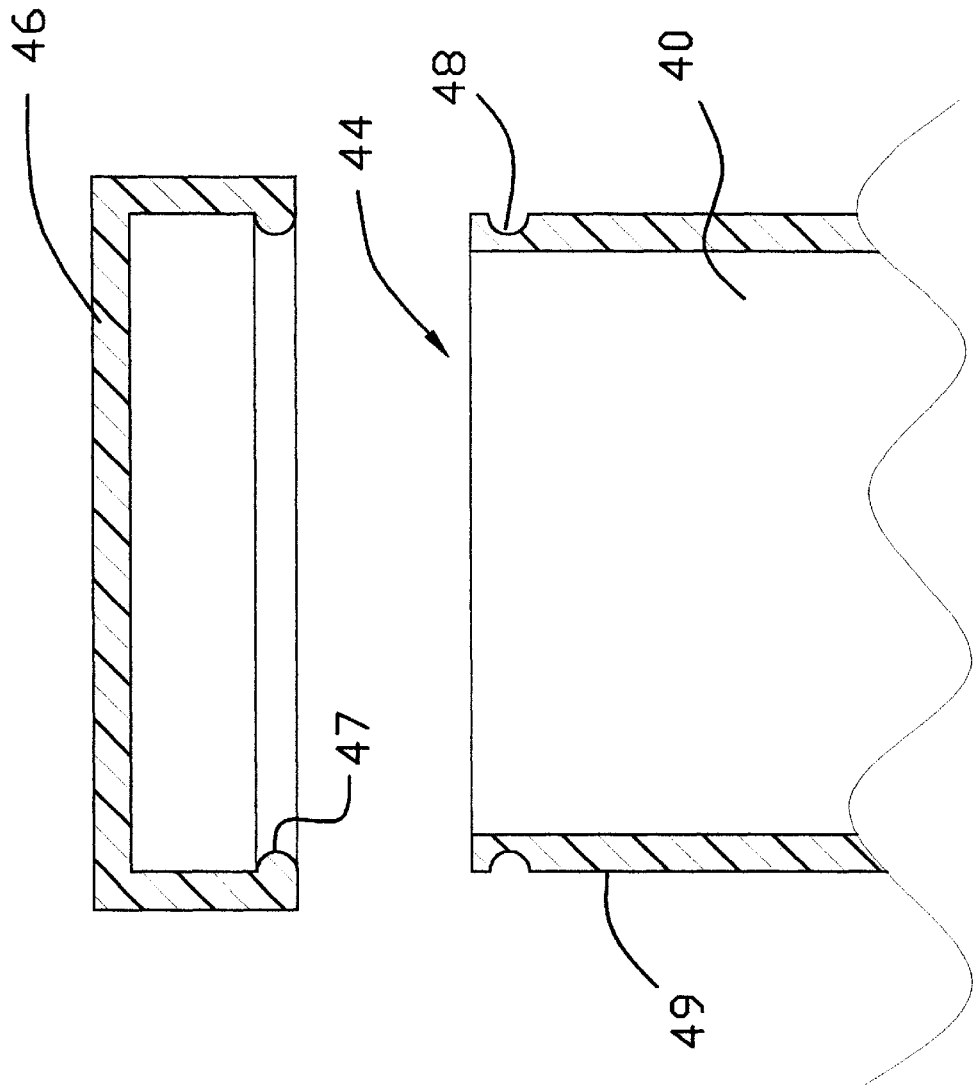
FIG. 3 is a cross-sectional view taken along line 3—3 of FIG. 2.

With reference now to the drawings, and in particular to FIGS. 1 through 3 thereof, a new windshield covering system embodying the principles and concepts of the present invention and generally designated by the reference numeral 10 will be described.

As best illustrated in FIGS. 1 through 3, the windshield covering system 10 generally comprises a flexible panel 20 and a handle 30.

The handle 30 is coupled to the panel 20 and includes a pair of side portions 32 that extend outwardly from an edge 22 of the panel 20. The handle 30 further includes a gripping portion 34 that extends between distal ends 31 of the side portions 32.

The handle 30 is preferably planar for facilitating rolling up of the panel 20 and the handle 30 into a storage position.

The handle 30 also includes a substantially rigid reinforcement portion 36. The reinforcement portion 36 extends outwardly from proximal ends 33 of the side portions 32. Thus, the reinforcement portion provides stiffening to the edge 22 of the panel 20. The reinforcement portion 36 extends along a length of the edge 22 of the panel 20 for facilitating manipulation of the panel 20 and facilitating rolling up of the panel 20 by holding opposite ends of the edge 22 apart.

The reinforcement portion 36 includes a medial portion 37 that extends between the proximal ends 33 of the side portions 32 for facilitating maintaining of the side portions 32 in spaced relationship to each other during use.

The panel 20 includes a folded portion 24 for forming the edge 22 of the panel 20 from which the handle 30 extends. The edge 22 includes a slot 66 that is positioned in a medial portion 23 of the edge 22. The reinforcement portion 36 is positioned in an interior space 28 formed by the folded portion 24. The side portions 32 extend through the slot 66 such that the gripping portion 34 is positioned in parallel spaced relationship to the edge 22 of the panel 20.

A storage container 40 is provided and includes a closed end 42 and an open end 44. The open end 44 is designed for receiving the panel 20 and the handle 30 when the panel 20 is in a rolled position for facilitating storage of the panel 20.

A lid 46 is removably couplable to the storage container 40 for covering the open end 42. Thus, the panel 20 and handle 30 are held within the storage container 40.

The lid 46 includes a lip 47 that extends around a perimeter edge 48 of the lid 46. The storage container 40 includes a circumferential groove 48 that extends around an outer surface 49 of the storage container 40 proximate the open end 42 for receiving the lip 47 of the lid 46. Thus, the lid 46 is removably engaged to the storage container 40.

In an embodiment, the panel has a trapezoidal shape to compliment the shape of the windshield of the vehicle. In an embodiment, the panel is formed from a semi-resilient plastic sheet rolled along a longitudinal axis such that the sheet is resistant to rolling up along a transverse axis of the sheet.

In use, the panel is removed from the storage container and unrolled over the windshield of a vehicle to prevent a build up of moisture on the windshield, thus preventing the development of frost and ice on the windshield.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windshield covering system comprising:
    a flexible panel formed of a semi-resilient plastic material that is rolled along a longitudinal axis and is resistant to being rolled up along a transverse axis of the panel;
    a handle coupled to said panel, said handle including a pair of side portions extending outwardly from an edge of said panel, said handle further including a gripping portion extending between distal ends of said side portions, said pair of outwardly extending side portions and said gripping portion forming a loop for positioning a portion of a user's hand therein;
    said flexible handle having a free end opposite said edge of said panel whereby said flexible panel is adapted for facilitating positioning of said flexible panel against an arcuate windshield in a selectable orientation;
    said handle being planar for facilitating rolling up of said panel and said handle into a storage position;
    said handle having a substantially rigid reinforcement portion, said reinforcement portion extending outwardly from proximal ends of said side portions, said reinforcement portions extending along a length of said edge of said panel for facilitating manipulation of said panel and facilitating rolling up of said panel;
    said reinforcement portion having a medial portion extending between said proximal ends of said side portions for facilitating positioning of said side portions in spaced relationship to each other;

said panel having a folded portion for forming said edge of said panel from which said handle extends said edge having a slot, said slot being positioned in a medial portion of said edge, said reinforcement portion being positioned in an interior space formed by said folded portion and said side portions extending through said slot such that said gripping portion is positioned in parallel spaced relationship to said edge of said panel;

a storage container having a generally circular closed end, a generally circular open end, and a solid elongated perimeter wall extending between said closed end and said open end, said open end being for receiving said panel and said handle when said panel is already in a rolled position for facilitating storage of said panel;

a lid removably couplable to said storage container for covering said open end whereby said panel and handle are held within said storage container;

said lid including a lip extending around a perimeter edge of said lid;

said storage container having a circumferential groove extending around an outer surface of said storage container proximate said open end for receiving said lip of said lid whereby said lid is removably engaged to said storage container.

* * * * *